US012803345B2

(12) United States Patent
Sunagawa

(10) Patent No.: US 12,803,345 B2
(45) Date of Patent: Nov. 17, 2026

(54) ACTUATOR

(71) Applicant: IWAKI CO., LTD., Tokyo (JP)

(72) Inventor: Keizo Sunagawa, Sayama (JP)

(73) Assignee: IWAKI CO., LTD., Tokyo (JP)

( * ) Notice: Subject to any disclaimer, the term of this patent is extended or adjusted under 35 U.S.C. 154(b) by 137 days.

(21) Appl. No.: 18/879,286

(22) PCT Filed: May 17, 2023

(86) PCT No.: PCT/JP2023/018424
§ 371 (c)(1),
(2) Date: Dec. 27, 2024

(87) PCT Pub. No.: WO2024/004419
PCT Pub. Date: Jan. 4, 2024

(65) Prior Publication Data
US 2026/0254293 A1 Aug. 27, 2026

(30) Foreign Application Priority Data
Jun. 30, 2022 (JP) ................................ 2022-106449

(51) Int. Cl.
*H02K 1/17* (2006.01)
*H02K 7/00* (2006.01)

(52) U.S. Cl.
CPC ............... *H02K 1/17* (2013.01); *H02K 7/003* (2013.01)

(58) Field of Classification Search
CPC .......... H02K 41/02; H02K 5/10; H02K 33/02; H02K 2203/12; H02K 7/1884;
(Continued)

(56) References Cited

U.S. PATENT DOCUMENTS 4,253,493 A * 3/1981 English ................. F16K 31/082 137/625.5
5,146,124 A * 9/1992 Higham ................... F16F 7/116 417/901

(Continued)

FOREIGN PATENT DOCUMENTS

JP 2000-260619 A 9/2000
JP 2008-259330 A 10/2008

OTHER PUBLICATIONS

Jun. 13, 2023 Search Report issued in International Patent Application No. PCT/JP2023/018424.

*Primary Examiner* — Maged M Almawri
(74) *Attorney, Agent, or Firm* — Oliff PLC

(57) ABSTRACT

An actuator includes a stator, a movable shaft inside thereof, and a movable element integrated therein. The stator includes a main body, with an outside yoke as housing, and first and second stoppers to close outside yoke openings. The main body includes an inside yoke, a permanent magnet attached outside the inside yoke, a stator frame including bobbins, and a coil wound around the bobbins. The first stopper includes a first projection part, and a first hole part wherein the movable shaft inserts at the first stopper center. The second stopper includes a second projection part, and a second hole part wherein the movable shaft is inserted at the second stopper center. The projection parts are fitted in opposite end portions, in the axial direction, of the stator frame. Attached to the hole parts are bearings for supporting the movable shaft so as to capable of reciprocating.

12 Claims, 7 Drawing Sheets

C-C CROSS-SECTION

(58) Field of Classification Search
CPC ...... H02K 7/1876; H02K 33/12; H02K 33/16; F02B 71/06; F02B 63/041; F02B 71/04; F04B 35/045; F04B 17/04
USPC ........... 310/30, 15, 14, 12.17, 35, 34, 12.23, 310/12.12, 75 R
See application file for complete search history.

(56) References Cited

U.S. PATENT DOCUMENTS

| | | | | |
|---|---|---|---|---|
| 5,365,210 | A | 11/1994 | Hines | |
| 5,440,183 | A * | 8/1995 | Denne | F15B 15/088 310/12.26 |
| 5,734,209 | A * | 3/1998 | Hallidy | E21B 43/128 310/12.21 |
| 5,814,907 | A * | 9/1998 | Bandera | H01F 7/1615 310/23 |
| 5,896,076 | A * | 4/1999 | van Namen | H01F 7/1615 335/229 |
| 6,225,713 | B1 | 5/2001 | Hattori et al. | |
| 6,323,567 | B1 * | 11/2001 | Hazelton | H02K 41/03 310/12.33 |
| 6,608,408 | B1 * | 8/2003 | Denne | H02K 41/031 310/34 |
| 8,449,274 | B1 * | 5/2013 | Zelechonok | F04B 17/04 417/419 |
| 9,435,347 | B2 * | 9/2016 | Danguy | F04D 29/049 |
| 9,534,629 | B1 * | 1/2017 | Lucas | F16C 32/0614 |
| 11,339,794 | B2 * | 5/2022 | Uneura | F04D 13/12 |
| 11,988,219 | B2 * | 5/2024 | Kuga | F02K 9/46 |
| 12,671,305 | B2 * | 6/2026 | Ogasawara | H02K 5/10 |
| 2002/0176790 | A1 * | 11/2002 | Akazawa | F04B 35/045 417/417 |
| 2005/0023905 | A1 * | 2/2005 | Sakamoto | H02K 33/16 310/12.17 |
| 2010/0277012 | A1 * | 11/2010 | Kobayashi | H02K 7/1884 310/30 |
| 2012/0175974 | A1 * | 7/2012 | Robertson | H01F 7/1646 310/12.26 |
| 2012/0279234 | A1 * | 11/2012 | Aigouy | F04B 35/045 310/12.04 |
| 2012/0280513 | A1 * | 11/2012 | Cockerill | F01L 9/20 290/1 A |
| 2013/0342036 | A1 * | 12/2013 | Akazawa | H02K 35/04 310/28 |
| 2015/0076930 | A1 * | 3/2015 | Kondo | H01F 7/1607 310/12.02 |
| 2015/0192218 | A1 * | 7/2015 | Arend | F16K 31/0679 310/38 |
| 2015/0369237 | A1 * | 12/2015 | Ahn | F04B 35/045 417/564 |
| 2017/0074418 | A1 * | 3/2017 | Liang | H01F 27/28 |
| 2017/0254438 | A1 * | 9/2017 | Ulbricht | F16K 31/0679 |
| 2018/0073557 | A1 * | 3/2018 | Hwang | F16C 19/02 |
| 2019/0032649 | A1 * | 1/2019 | Roh | F04B 39/123 |
| 2019/0048787 | A1 * | 2/2019 | Baeuerle | F04B 35/045 |
| 2023/0039432 | A1 * | 2/2023 | Abdul | H02K 5/1732 |
| 2024/0413701 | A1 * | 12/2024 | White | F16J 15/002 |

* cited by examiner

A-A CROSS-SECTION

B-B CROSS-SECTION

C-C CROSS-SECTION

ACTUATOR

TECHNICAL FIELD

The present invention relates to an actuator.

BACKGROUND ART

As a driving source that reciprocates a reciprocating member such as a diaphragm, an actuator (see, Patent Literature 1, for example) is known. The actuator includes a shaft that reciprocates in an axial direction inside a stator and that has a movable element, and a permanent magnet is arranged in the stator at a location opposite to the movable element in a radial direction.

Further, the actuator includes the permanent magnet and a coil wherein a magnetic field formed by the permanent magnet is positioned in-between and is structured such that the shaft is caused to reciprocate in the axial direction by changing orientations of the magnetic field generated by flowing an electric current through the coil. In addition, the shaft is supported so as to be swingable in the axial direction by leaf springs provided between axially opposite end portions of the stator on one side and a flange on the other side.

PRIOR ART LITERATURE

Patent Literature

Patent Literature 1: Japanese Patent Laid-Open No. 2008-259330

SUMMARY OF INVENTION

Problem to be Solved by Invention

In the actuator according to the conventional technique disclosed in the above-mentioned Patent Literature 1, because it is necessary to fix the permanent magnet to the flange by using an adhesive agent or the like, there are problems in that it is difficult to achieve dimension management of component parts including the thickness of the adhesive agent or the like. Moreover, efficiency of magnetic circuitry may also be degraded by a gap occurring in the magnetic circuitry due to the adhesive agent or the like. Further, there is also another problem in that centering the shaft may not be easy because the leaf springs provided at the end portions of the stator are used to function as bearings by being fitted in grooves in the shaft.

The present invention has been made in consideration of the above circumstances, and has an object to provide an actuator capable of facilitating the centering and the dimension management while using a simple component configuration, and also capable of enhancing the efficiency of the magnetic circuitry.

Solution to Problem

An actuator according to an aspect of the present invention includes a stator having a circular cylindrical shape; a movable shaft inserted inside the stator and configured to reciprocate in an axial direction; and a movable element having a circular cylindrical shape and being provided inside the stator and integrally attached to the movable shaft. The stator includes a stator main body having a circular cylindrical shape, an outside yoke being structured with a magnetic material, having a circular cylindrical shape, and accommodating the stator main body therein, and a first stopper and a second stopper being structured with a magnetic material and configured to close openings located at opposite ends of the outside yoke. The stator main body includes an inside yoke being structured with a magnetic material, having an annular shape, facing the movable element in a radial direction and being arranged so as to surround an outer circumference in a central part, in the axial direction, of the movable element, a permanent magnet having an annular shape and being attached to an outer circumference of the inside yoke, a stator frame having a circular cylindrical shape, including a bobbin which is provided on at least one side, in the axial direction, of the inside yoke and the permanent magnet and around which a coil is wound, and being configured to support the inside yoke and the permanent magnet, and the coil wound around the bobbin of the stator frame. The first stopper includes a first projection part having a circular cylindrical shape and projecting from a central area toward the second stopper, and has a first hole part through which the movable shaft is inserted at a center of the first stopper. The second stopper includes a second projection part having a circular cylindrical shape and projecting from a central area toward the first stopper, and has a second hole part through which the movable shaft is inserted at a center of the second stopper. The first projection part and the second projection part are fitted in opposite end portions, in the axial direction, of the stator frame. The movable element is disposed between the first projection part and the second projection part. And attached to the first hole part and the second hole part are bearings that supports the movable shaft so as to capable of reciprocating.

In an embodiment of the present invention, the inside yoke is arranged with the stator frame by insert molding.

In another embodiment of the present invention, the permanent magnet is magnetized in the radial direction. Also, the permanent magnet includes a plurality of magnet pieces each having an arc shape.

In yet another embodiment of the present invention, an inner circumferential surface of the permanent magnet is in direct contact with an outer circumferential surface of the inside yoke.

In yet another embodiment of the present invention, an outer circumferential surface of the permanent magnet is in direct contact with an inner circumferential surface of the outside yoke.

In yet another embodiment of the present invention, the bobbin includes a first bobbin provided on one side, in the axial direction, of the inside yoke and the permanent magnet and a second bobbin provided on the other side, the stator frame has a winding groove for passing a winding from the first bobbin to the second bobbing, and the coil is continuously wound around from the first bobbin to the second bobbin via the winding groove.

In yet another embodiment of the present invention, the outside yoke and the first stopper are integrally formed.

Advantageous Effects of Invention

According to the present invention, it is possible to facilitate the centering and the dimension management while using the simple component configuration and to also enhance the efficiency of the magnetic circuitry.

DESCRIPTION OF EMBODIMENTS

Figure 1:
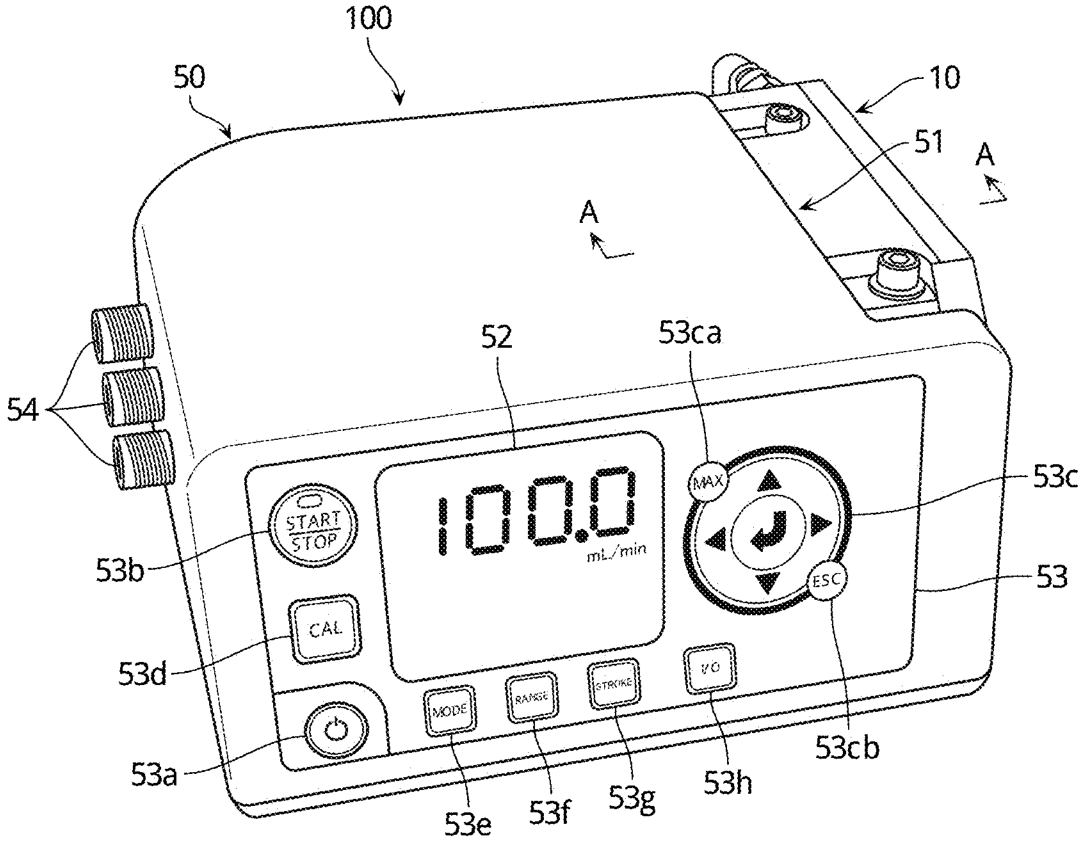
FIG. 1 is a perspective view showing an exterior configuration of a pump device including an actuator according to an embodiment of the present invention.

The following will describe an actuator according to embodiments of the present invention in detail, with reference to the accompanying drawings. It should be noted that the following embodiments are not intended to limit the invention set forth in the claims. Also, not all the combinations of the features described in the embodiments are necessarily requisite for the means for solving the problems of the invention. In addition, in the following embodiments, some of the constituent elements that are the same as or correspond to each other will be referred to by using the same reference characters, and duplicate explanations thereof will be omitted. Furthermore, in the embodiments, the positional arrangements, scales, and dimensions of the constituent elements may be exaggerated or diminished and presented differently from those in reality, and some of the constituent elements may be omitted from the presentation.

A Configuration of a Pump Device Including an Actuator

Figure 2:
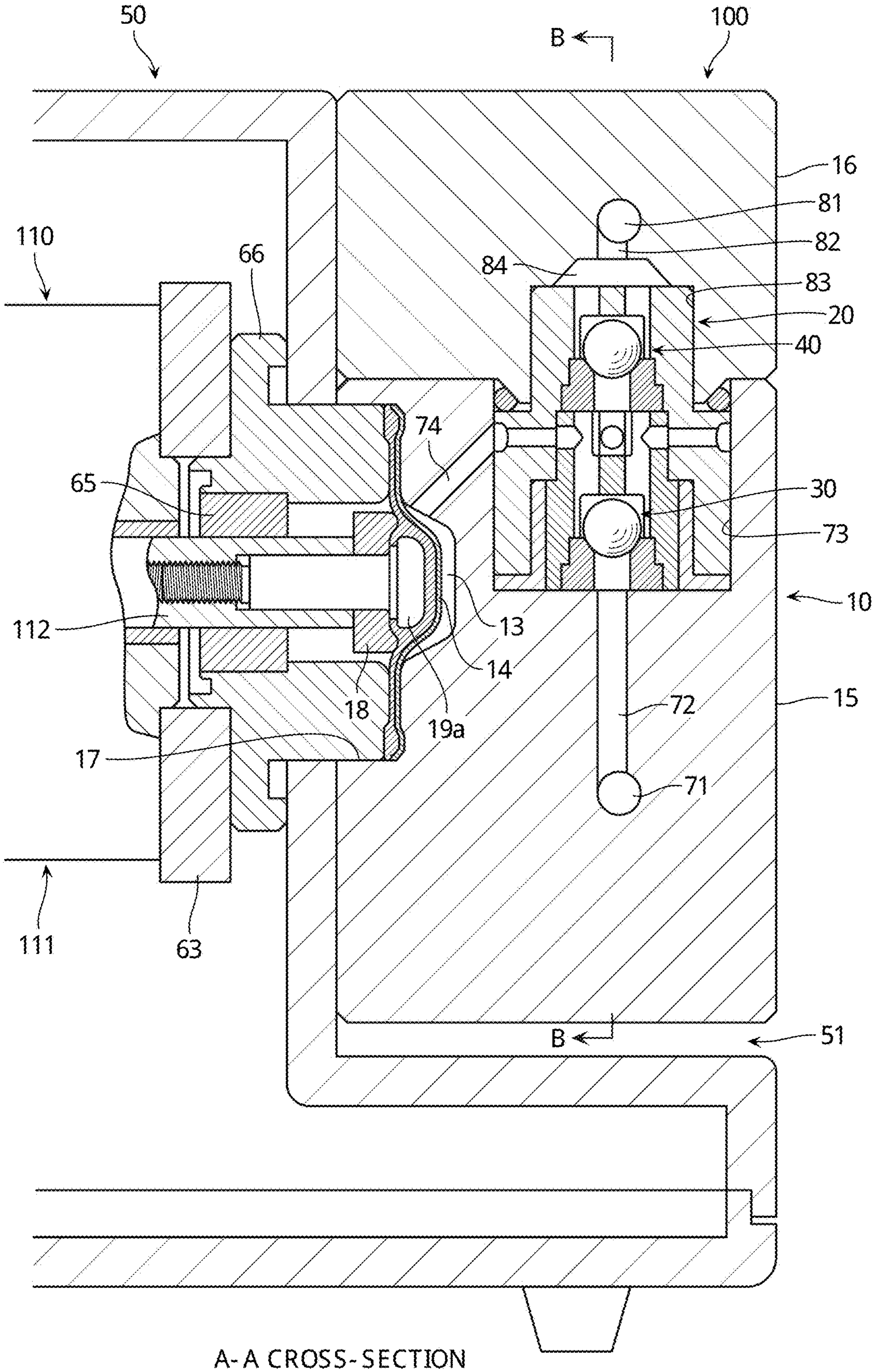
FIG. 2 is a cross-sectional view taken at the line A-A in FIG. 1.
Figure 3:
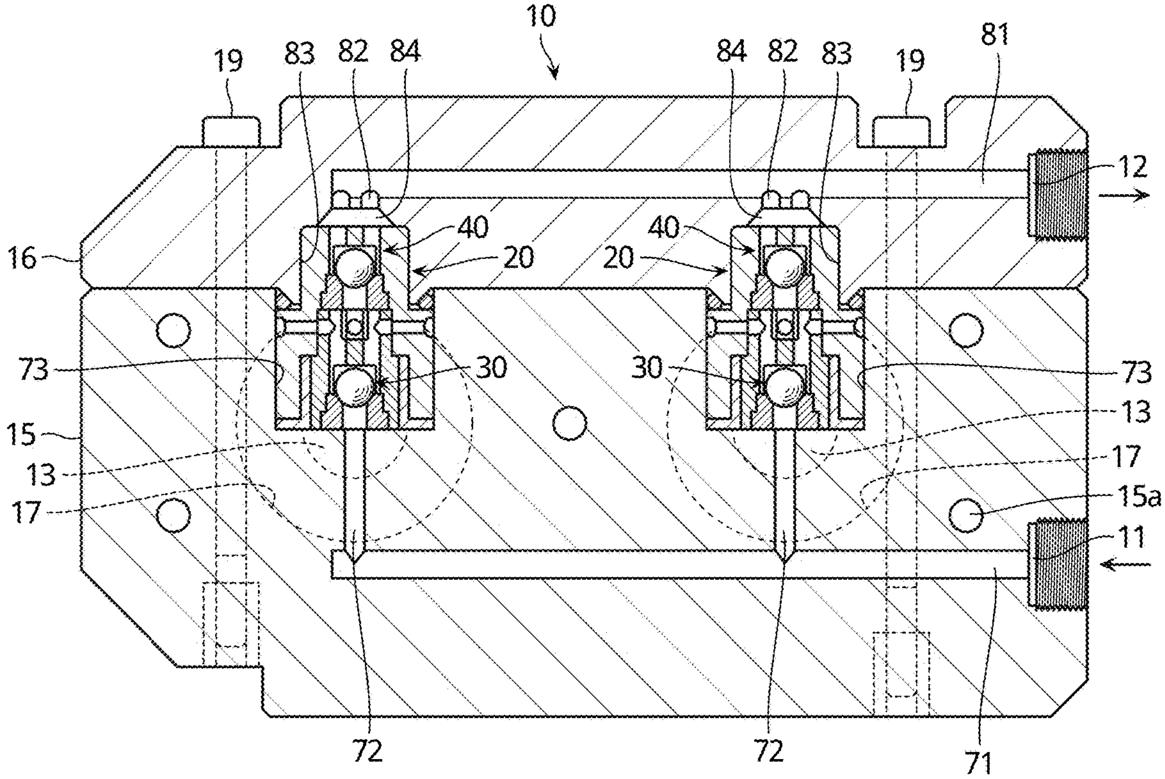
FIG. 3 is a cross-sectional view taken at the line B-B in FIG. 2.
Figure 4:
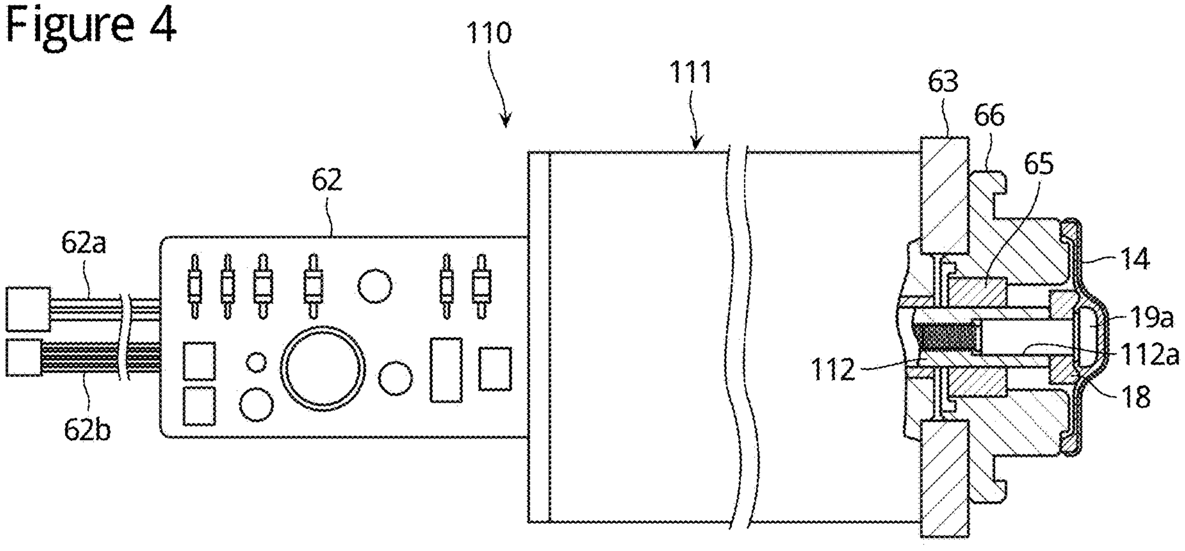
FIG. 4 is a partial cross-sectional view showing the actuator to which a diaphragm of the pump device is attached.

FIG. 1 is a perspective view showing an exterior configuration of a pump device including an actuator according to an embodiment of the present invention. FIG. 2 is a cross-sectional view taken at the line A-A in FIG. 1. FIG. 3 is a cross-sectional view taken at the line B-B in FIG. 2. Also, FIG. 4 is a partial cross-sectional view showing the actuator to which a diaphragm of the pump device is attached.

As shown in FIG. 1, a pump device 100 includes a pump head 10 and a device main body part 50 to which the pump head 10 is detachably attached.

The pump head 10 is structured with a molded resin product, for example. The device main body part 50 includes a resin casing, for example, and has, on a side of one of the lateral surfaces (the right lateral surface in FIG. 1) thereof, a head attachment part 51 having a recessed shape formed by removing parts of the top surface, the side surface, and the rear surface. The pump head 10 is attached to the head attachment part 51 in such a manner that the top surface, the side surface, and the rear surface thereof do not jut out from the device main body part 50. As explained herein, the pump head 10 is formed to have dimensions in such a range that, when being attached to the head attachment part 51, the pump head 10 fits into and filling a space in the head attachment part 51 so that the pump device 100 has a rectangular shape as a whole.

The device main body part 50 includes, on the inside thereof, flexible diaphragms 14 (see FIG. 2) respectively attached to a plurality of pump chambers 13 (see FIG. 2) of the pump head 10, which will be explained later, in a liquid-tight manner and a plurality of actuators 110 (see FIG. 4) that reciprocate the diaphragms 14. In the present embodiment, for example, two pump chambers 13 and two actuators 110 are provided.

Further, the device main body part 50 includes: an operation panel part 53 having a display 52 and being provided on the front surface side; and a plurality of external input/output ports 54 provided on the lateral surface opposite from the head attachment part 51 of the device main body part 50. In addition, on the inside of the device main body part 50, a control unit (not shown) that controls operations of the pump device 100 is provided. The display 52 displays various types of information related to the pump device 100 including a set flow rate of the pump device 100. For example, it is possible to set the set flow rate in a flow rate range of 100 ml/min to 0.01 ml/min.

Together with the display 52, the operation panel part 53 includes a power supply button 53*a*, a pump operation start/stop button 53*b*, and a cursor/return operation part 53*c*. Further, the operation panel part 53 includes a calibration button 53*d*, a mode setting button 53*e*, a range setting button 53*f*, a stroke setting button 53*g*, and an I/O setting button 53*h*.

With the cursor/return operation part 53*c*, a maximum volume designation button 53*ca* and an escape button 53*cb* are provided together. By carrying out various types of operation inputs via the operation panel part 53, a user of the pump device 100 is able to perform various types of operations related to the motion, the settings, and the like of the pump device 100.

As shown in FIG. 2 and FIG. 3, the pump head 10 includes a suction port 11 for a transport fluid to which a suction-side hose is connected via a connection nut (not shown), a discharge port 12 for the transport fluid to which a discharge-side hose is connected via a connection nut (not shown), and the plurality of pump chambers 13 communicating with the suction port 11 and the discharge port 12. The pump head 10 accommodates, on the inside thereof, a plurality of valve modules 20 arranged along a horizontal direction. Each of the valve modules 20 includes a suction valve 30 and a discharge valve 40 that are arranged along a vertical direction and are each structured with a ball valve, for example.

To the inside of the pump chambers 13 of the pump head 10, the transport fluid from a tank (not shown) is introduced via the suction-side hose, the suction port 11, and pump chamber communication flow paths 74. Further, from the pump chambers 13, the transport fluid therein is discharged to the outside via the pump chamber communication flow paths 74, the discharge port 12, and the discharge-side hose.

The pump head 10 includes a first block 15 and a second block 16 structuring a plurality of pump head blocks that can be separated, in the vertical direction, at a position between the suction valves 30 and the discharge valves 40 of the plurality of valve modules 20. The first block 15 includes a first suction-side flow path 71 extending horizontally and communicating with the suction port 11 formed in the lateral surface; and a plurality of second suction-side flow paths 72 each extending vertically upward and communicating with the first suction-side flow path 71.

A plurality of first accommodation chambers 73 that communicate with the second suction-side flow paths 72, open toward the top, and accommodate certain sections of the valve modules 20 positioned on the suction valves 30 side are formed in the first block 15. Further, diaphragm attachment holes 17 for forming the pump chambers 13 in collaboration with the diaphragms 14 are formed in the first block 15 so as to open toward a wall surface of the head attachment part 51 of the device main body part 50 in a direction intersecting the first and the second suction-side flow paths 71 and 72. The diaphragm attachment holes 17 are provided in certain positions within the first block 15 so that an upper part of each of the pump chambers 13 is positioned below a plurality of side flow paths arranged at prescribed intervals in the circumferential direction of the corresponding valve module 20. The pump chamber communication flow paths 74 described above extend diagonally upward from the plurality of pump chambers 13, respectively, and communicate with the plurality of first accommodation chambers 73.

The second block 16 includes a first discharge-side flow path 81 extending horizontally and communicating with the discharge port 12 formed in the lateral surface; and a plurality of second discharge-side flow paths 82 each extending vertically downward and communicating with the first discharge-side flow path 81. A plurality of second accommodation chambers 83 that communicate with the second discharge-side flow paths 82, open toward the bottom, and accommodate certain sections of the valve modules 20 positioned on the discharge valves 40 side are formed in the second block 16. A circular truncated cone space 84 is formed above each of the second accommodation chambers 83 so that communication with the second discharge-side flow path 82 is allowed via the circular truncated cone space 84.

The first block 15 and the second block 16 structure the pump head 10, by being integrally formed through screw fastening using a plurality of fastening bolts 19 that extend vertically and serve as coupling means. When being integrally formed, the first block 15 and the second block 16 in the present embodiment have a rectangular shape such that the corner sections positioned on the operation panel part 53 side of the device main body part 50 are each chamfered. The pump head 10 structured in this manner is integrally attached to the lateral surface side of the device main body part 50, through screw fastening using a plurality of attachment screws (not shown) so as to be attached, via attachment holes 15*a*, to the head attachment part 51 of the device main body part 50.

As shown in FIG. 4, the actuators 110 are each an electromagnetic actuator, for example, and configured to be able to drive the plurality of diaphragms 14 individually in a phase shifted manner. A control circuit board 62 having an electrical wiring 62*a* and a signal wiring 62*b* connected thereto is provided on a basal end side of each of the actuators 110. Further, mounted on the control circuit board 62 is a position sensor (e.g., a linear encoder or the like; not shown) that detects the position of a movable shaft 112, for example. The tip end side of the actuator 110, which is the opposite side from the control circuit board 62, is attached, by screw fastening or the like, for example, to an attachment panel 63 to be attached to an internal attachment part (not shown) of the device main body part 50.

A Configuration of the Actuator

Figure 5:
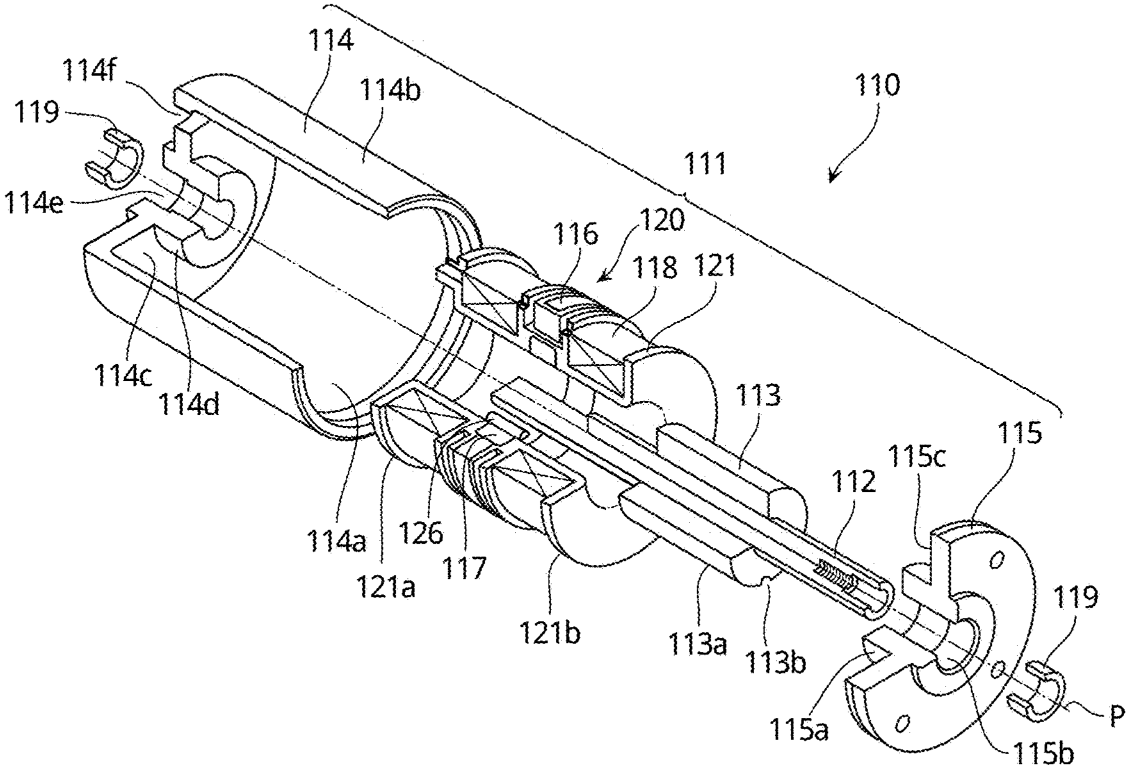
FIG. 5 is an exploded perspective view showing the actuator while a part thereof is cut out.
Figure 6:
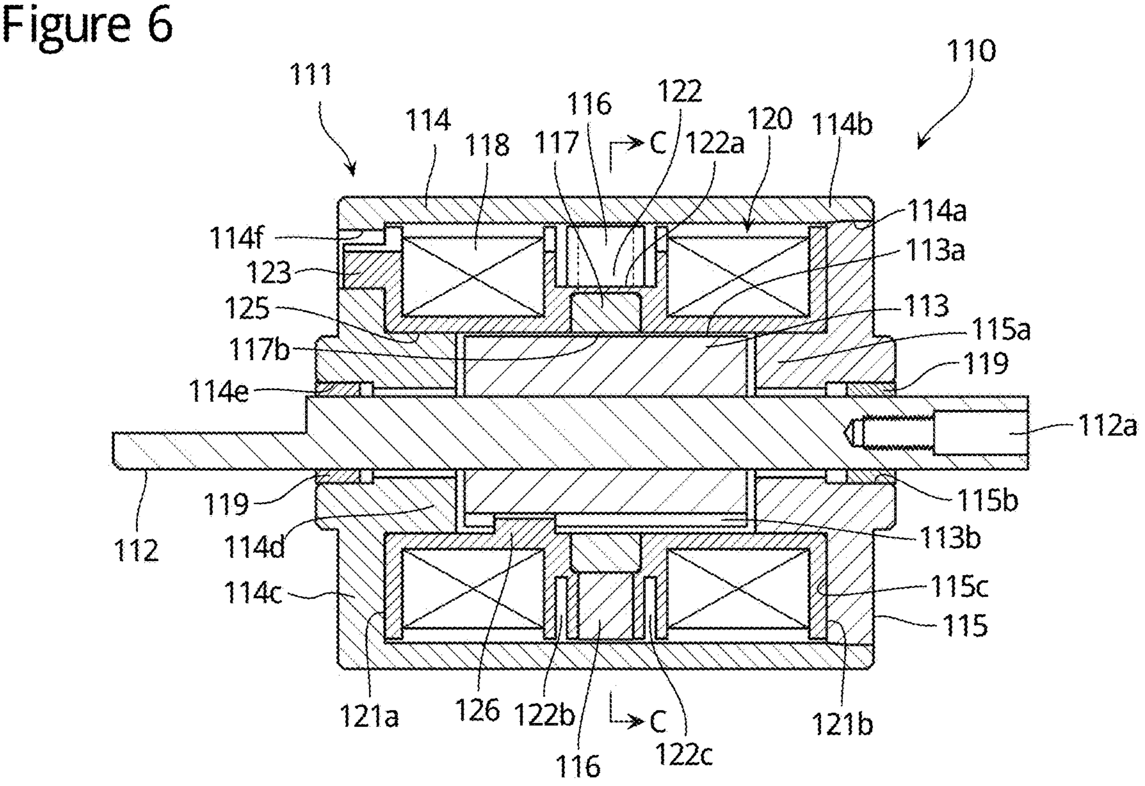
FIG. 6 is a cross-sectional view showing the actuator.
Figure 7:
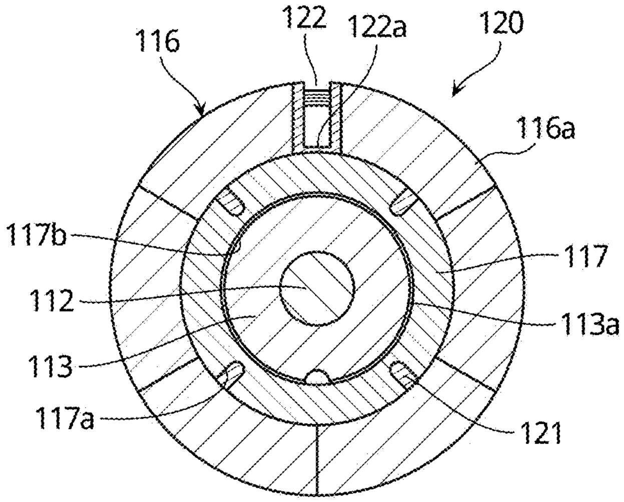
FIG. 7 is a cross-sectional view taken at the line C-C in FIG. 6.

FIG. 5 is an exploded perspective view showing the actuator 110 while a part thereof is cut out. Also, FIG. 6 is a cross-sectional view showing the actuator 110. FIG. 7 is a cross-sectional view taken at the line C-C in FIG. 6.

As shown in FIGS. 5 to 7, the actuator 110 includes: a stator 111 having a circular cylindrical shape; the movable shaft 112 that is inserted inside the stator 111 and configured to reciprocate in an axial direction shown as a center axis P; and a movable element 113 having a circular cylindrical shape and being provided inside the stator 111 and integrally attached to the movable shaft 112.

The stator 111 includes: a stator main body 120 having a circular cylindrical shape; an outside yoke 114 that serves as a case member being structured with a magnetic material, having the shape of a bottomed circular cylinder, and accommodating the stator main body 120 therein; and a lid-like stopper 115 being structured with a magnetic material and fitted in an opening 114*a* of the outside yoke 114. On the inside of the outside yoke 114, the stator main body 120 is arranged so as to cover the periphery of the movable element 113 while facing the movable element 113 in the radial direction, via a small gap (a clearance).

The stator main body 120 includes a stator frame 121 structured with a molded resin product, for example. As a result of insert molding, the stator frame 121 supports, in a central part thereof in the axial direction, an inside yoke 117 being structured with a magnetic material and having an annular shape. The inside yoke 117 is arranged so as to surround the outer circumference in a central part, in the axial direction, of the movable element 113 via a prescribed clearance.

On the outer circumferential side of the inside yoke 117, a permanent magnet 116 having an annular shape is attached. The stator frame 121 includes a first bobbin 121*a* provided on one side, in the axial direction, of the inside yoke 117 and the permanent magnet 116 and includes a second bobbin 121*b* provided on the other side. A coil 118 is wound around the bobbins 121*a* and 121*b*. Alternatively, only one of the bobbins 121*a* and 121*b* may be provided on one side, in the axial direction, of the inside yoke 117 and the permanent magnet 116, so that the coil 118 is wound around only one of the bobbins 121*a* and 121*b* provided on the one side.

Figure 8:
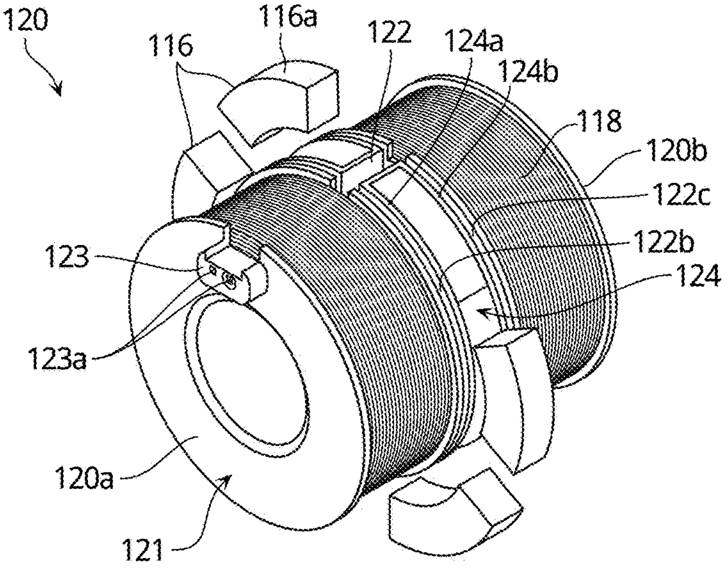
FIG. 8 is a perspective view showing a stator main body of the actuator while a part thereof is exploded.
Figure 9:
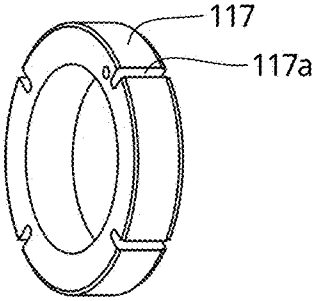
FIG. 9 is a perspective view showing an inside yoke of the stator main body.

FIG. 8 is a perspective view showing the stator main body 120 of the stator 111 while a part thereof is exploded. FIG. 9 is a perspective view showing the inside yoke 117 of the stator main body 120.

As shown in FIG. 8, in an annular space between the bobbins 121*a* and 121*b* of the stator frame 121, a groove-like attachment part 124 that is interposed between a pair of annular plates 124*a* and 124*b* is formed. As shown in FIG. 7 and FIG. 8, the permanent magnet 116 is attached to the abovementioned groove-like attachment part 124 formed in the stator frame 121. The permanent magnet 116 is structured with a plurality of (six in the present example) magnet pieces 116*a* each of which has an arc shape and which, as a whole, form an annular shape.

Each of the magnet pieces 116*a* structuring the permanent magnet 116 is magnetized so that the outer side in the radial direction corresponds to an N pole (or an S pole), whereas the inner side in the radial direction corresponds to an S pole (or an N pole). The magnet pieces 116*a* are in direct contact with the inside yoke 117 without an intermediary of an adhesive agent or the like and are attached to the inside yoke 117 by magnetic force.

The annular plates 124*a* and 124*b* structuring the attachment part 124 of the stator frame 121 each have a cutout part in a certain part in the circumferential direction. As a result of the two annular plates 124*a* and 124*b* being coupled together by the cutout parts, a winding groove 122 for passing a winding of the coil 118 is formed. Further, formed at one of the end portions (the end portion opposing a bottom part 114*c* of the outside yoke 114) of the stator frame 121 is a projection part 123 that is for a rotation positioning purpose and is to be fitted into a hole part 114*f* (see FIG. 6) formed in the bottom part 114*c*. The projection part 123 has formed therein a plurality of hole parts 123*a* for passing the winding of the coil 118.

The winding of the coil 118 passes through one of the plurality of hole parts 123*a* and, after being wound around the bobbin 121*a* provided on the one side, is wound once around a side groove 122*b* provided between the bobbin 121*a* and the annular plate 124*a*. Further, the winding of the coil 118 is arranged to follow, in the axial direction, along a bottom part 122*a* (see FIG. 6) of the winding groove 122 so as to reach the other bobbin 121*b* via the winding groove 122. Subsequently, after being wound once around a side groove 122*c* provided between the other bobbin 121*b* and the annular plate 124*b*, the winding is wound around the bobbin 121*b* and is returned to another one of the plurality of hole parts 123*a* via the winding groove 122 again, so that the winding is continuously wound around the two bobbins 121*a* and 121*b*. In such manner, it is possible to form the coil 118 in one session of winding process.

As shown in FIG. 7 and FIG. 9, the inside yoke 117 has groove parts 117*a* extending in the axial direction and being provided in four locations at equal intervals along the circumferential direction, for example, on the outer circumferential side. In the present embodiment, the inside yoke 117 is arranged with the stator frame 121 by insert molding. In other words, at the time when the stator frame 121 is molded with resin, the inside of the groove parts 117*a* is also filled with a resin material so that the inside yoke 117 is insert-molded while the two bobbins 121*a* and 121*b* are in a contiguous state. As a result, the inside yoke 117 is integrally formed with the stator frame 121, in such a manner that an inner circumferential surface 117*b* thereof (see FIG. 7) is accurately flush with an inner circumferential surface 125 (see FIG. 6) of the stator frame 121.

Meanwhile, as shown in FIG. 6, the outside yoke 114 has a first projection part 114*d* having a circular cylindrical shape and projecting from a central area of the bottom part 114*c* toward the opening 114*a*. When the stator main body 120 is accommodated in the outside yoke 114, one of the end portions of the inner circumferential surface 125 of the stator frame 121 is fitted in the first projection part 114*d* of the outside yoke 114. In addition, from a viewpoint of fixing and magnetic efficiency of the permanent magnet 116, it is desirable, among the permanent magnet 116 and the bobbins 121*a* and 121*b* of the stator main body 120, to design at least the outer circumferential surface of the permanent magnet 116 to have such a dimension so as to be in direct contact with the inner circumferential surface of a circular cylindrical part 114*b* of the outside yoke 114. Meanwhile, from a viewpoint of assemblability, it is desirable that there is a small clearance.

The stopper 115 fitted in the opening 114*a* of the outside yoke 114 has a second projection part 115*a* having a circular cylindrical shape and projecting from a central area toward the first projection part 114*d*. When the stopper 115 is fitted in the opening 114*a* of the outside yoke 114 accommodating the stator main body 120, the outer circumference of the stopper 115 is fitted in the inner circumferential surface of the circular cylindrical part 114*b* of the outside yoke 114, while the second projection part 115*a* is fitted in the other end portion of the inner circumferential surface 125 of the stator frame 121. As described herein, the first projection part 114*d* and the second projection part 115*a* are fitted in the opposite end portions, in the axial direction, of the stator frame 121. When the stopper 115 has completely been fitted into the outside yoke 114, the stator main body 120 is sandwiched and held in the axial direction, too, by the bottom part 114*c* of the outside yoke 114 and an inner lateral surface 115*c* of the stopper 115. As a result, the stator main body 120 is accurately positioned and fixed with respect to the outside yoke 114 and the stopper 115. At that time, it is desirable when the distance between the opposing end surfaces of the first projection part 114*d* and the second projection part 115*a* is longer than the length obtained by adding the moving distance of the movable element 113 in the axial direction to the length of the movable element 113 in the axial direction. With this configuration, when the movable element 113 reciprocates in the axial direction, it is possible to prevent the movable element 113 from colliding with the first projection part 114*d* and the second projection part 115*a*.

Further, in center parts of the bottom part 114*c* and the first projection part 114*d*, the outside yoke 114 has a first hole part 114*e* penetrated by the movable shaft 112. Further, in a center part thereof, the stopper 115 has a second hole part 115*b* penetrated by the movable shaft 112. To the hole parts 114*e* and 115*b*, bearings 119 that pivotally support the movable shaft 112 are attached by press-fitting or the like. The bearings 119 may be, for example, dry-type bearings (dry bearings) coated with fluororesin and may preferably be structured by using a magnetic material. In this configuration, it is possible to determine centering of the movable shaft 112 only with the outside yoke 114, the stopper 115, and the bearings 119 attached thereto, which makes accurate centering possible. As a result, it is also possible to accurately determine a clearance between the stator 111 and the movable element 113.

A Method for Manufacturing the Actuator

The actuator 110 structured as described above may be manufactured, for example, as follows: At first, the stator main body 120 is manufactured. For example, the stator main body 120 may be manufactured in the following manner: To begin with, while the inside yoke 117 is set in a mold, the stator frame 121 is molded by insert resin molding. Subsequently, the winding is wound around the two bobbins 121*a* and 121*b* of the stator frame 121 in one session of winding process, so as to place the coil 118. Lastly, the arc-shaped magnet pieces 116*a* are fitted into the attachment part 124 of the stator frame 121 one by one, so that the permanent magnet 116 is disposed so as to be in close contact with the outer circumferential surface of the inside yoke 117, and the stator main body 120 is thus formed. In this situation, at the time of disposing the permanent magnet 116, although the last arc-shaped magnet piece 116*a* to be fitted into the attachment part 124 has a tendency of easily being repelled in the radial direction, the process itself of fitting the piece is easy. Alternatively, it is also acceptable to fit the arc-shaped magnet pieces 116*a* into the attachment part 124 of the stator frame 121 and to subsequently wind a tape around the outer circumference of the permanent magnet 116.

After that, the stator main body 120 manufactured as described above is inserted up to a final position on the inside of the outside yoke 114 so that the projection part 123 is inserted into the hole part 114*f*. Subsequently, the movable shaft 112 to which the movable element 113 is attached is inserted into inner side of the stator main body 120 and is inserted into the bearing 119 up to a final position. In this situation, a groove 113*b* extending in the axial direction is formed in a part of an outer circumferential surface 113*a* of the movable element 113. The movable element 113 is inserted in inner of the stator main body 120 so that a projection 126 formed on the inner circumferential surface 125 of the stator frame 121 is fitted in the groove 113*b*. With this configuration, it is possible to prevent the movable element 113 from moving in the rotation direction.

Lastly, the stopper 115 is attached to the outside yoke 114 so that the movable shaft 112 goes through the bearing 119, and the actuator 110 is thus formed.

Advantageous Effects of the Embodiment

In the actuator 110 according to the present embodiment, the inside yoke 117 is integrally arranged with the stator frame 121 by the insert molding. Thus, it is possible to arrange the inside yoke 117 with respect to the stator frame 121 with an excellent level of precision. Further, by having the first projection part 114*d* of the outside yoke 114 and the second projection part 115*a* of the stopper 115 fitted thereto, it is possible to position the stator frame 121 also with respect to the outside yoke 114 and the stopper 115 with an excellent level of precision. In addition, the movable shaft 112 is supported by the bearing 119 attached to the first hole part 114*e* of the outside yoke 114 and the bearing 119 attached to the second hole part 115*b* of the stopper 115. As a result, the movable shaft 112 is centered with respect to the outside yoke 114 and the stopper 115 with an excellent level of precision and will be consequently centered also with respect to the stator frame 121, i.e., the stator main body 120, with an excellent level of precision. With this configuration, it is possible to ensure, with an excellent level of precision, a prescribed clearance between the outer circumferential surface 113*a* of the movable element 113 and the inner circumferential surfaces 117*b* and 125 of the inside yoke 117 and the stator frame 121.

Further, the permanent magnet 116 having the annular shape is fixed by the magnetic force as being in direct contact with the outer circumferential surface of the inside yoke 117, so that the outer circumferential surface is covered by the inner circumferential surface of the outside yoke 114. Thus, there is no need to fix the permanent magnet 116 by using an adhesive agent or the like, and as a result, it is possible to enhance the efficiency of the magnetic circuitry. In addition, by structuring the bearings 119 with a magnetic material, because it is possible to also use the bearings 119 as magnetic circuitry, it is possible to further enhance the efficiency of the magnetic circuitry.

As shown in FIG. 6, the movable shaft 112 of the actuator 110 is driven to reciprocate in the axial direction indicated with the arrow in FIG. 6, by driving force of the actuator 110. Formed at the tip end side of the movable shaft 112 is a bolt attachment hole 112*a* provided with a screw part positioned on the far side in the axial direction. As shown in FIG. 2 and FIG. 4, an insert bolt 19*a* is attached to the bolt attachment hole 112*a*. In other words, on the tip end side of the movable shaft 112, the diaphragm 14 serving as a reciprocating member is attached via the insert bolt 19*a*. A central rear surface part of the diaphragm 14 is supported by a retainer 18 attached to the movable shaft 112.

Further, between the attachment panel 63 to which the actuator 110 is attached and the diaphragm 14, a bracket 66 having a circular cylindrical shape is attached. The bracket 66 has, on the inside thereof, a bush 65 for a water-proof purpose and is fitted into one of the diaphragm attachment holes 17 formed in the first block 15 of the pump head 10. A circumferential rim part of the diaphragm 14 is sandwiched and held between a bottom part of the diaphragm attachment hole 17 and the bracket 66. A front surface central part of the diaphragm 14 forms the pump chamber 13, in collaboration with the first block 15 of the pump head 10.

The pump device 100 may operate as follows: On the basis of setting information input via the operation panel part 53, the control unit in the device main body part 50 executes, in parallel, suction operation where the diaphragm 14 is retreated horizontally together with the movable shaft 112 of one of the two actuators 110 and discharge operation where the diaphragm 14 is advanced horizontally together with the other movable shaft 112, in order to transport the transport fluid at a prescribed flow rate. In other words, during the suction operation, for example, the suction valve 30 of the valve module 20 opens, whereas the discharge valve 40 closes. In contrast, during the discharge operation, for example, the discharge valve 40 of the valve module 20 opens, whereas the suction valve 30 closes. In such manner, the actuators 110 are configured to be able to drive the plurality of diaphragms 14 individually in a phase shifted manner.

Figure 10:
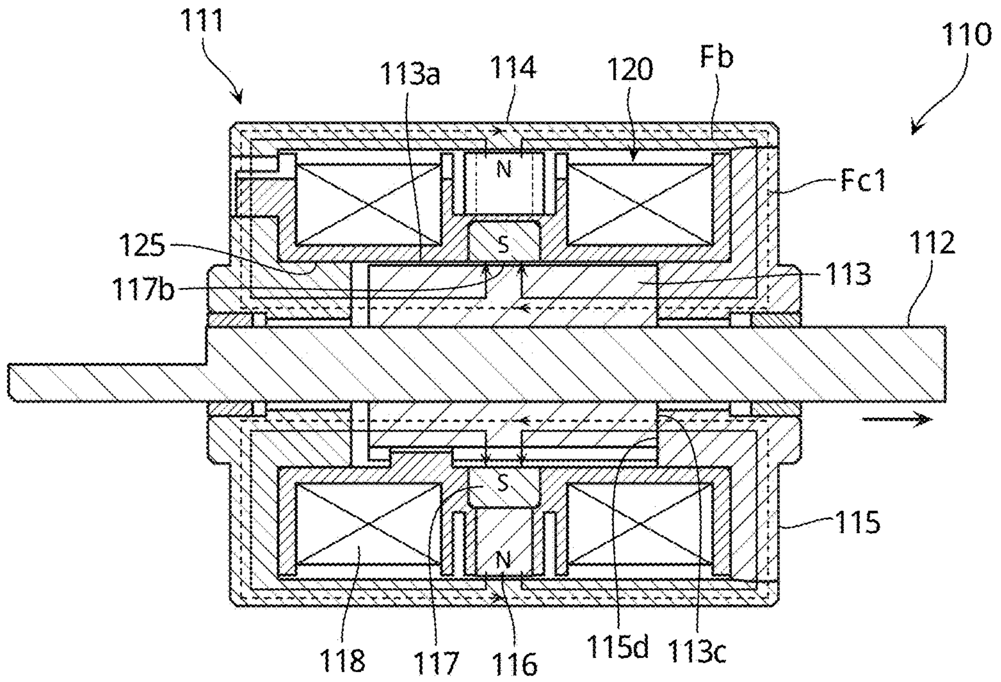
FIG. 10 is a cross-sectional view for explaining an operation of the actuator.
Figure 11:
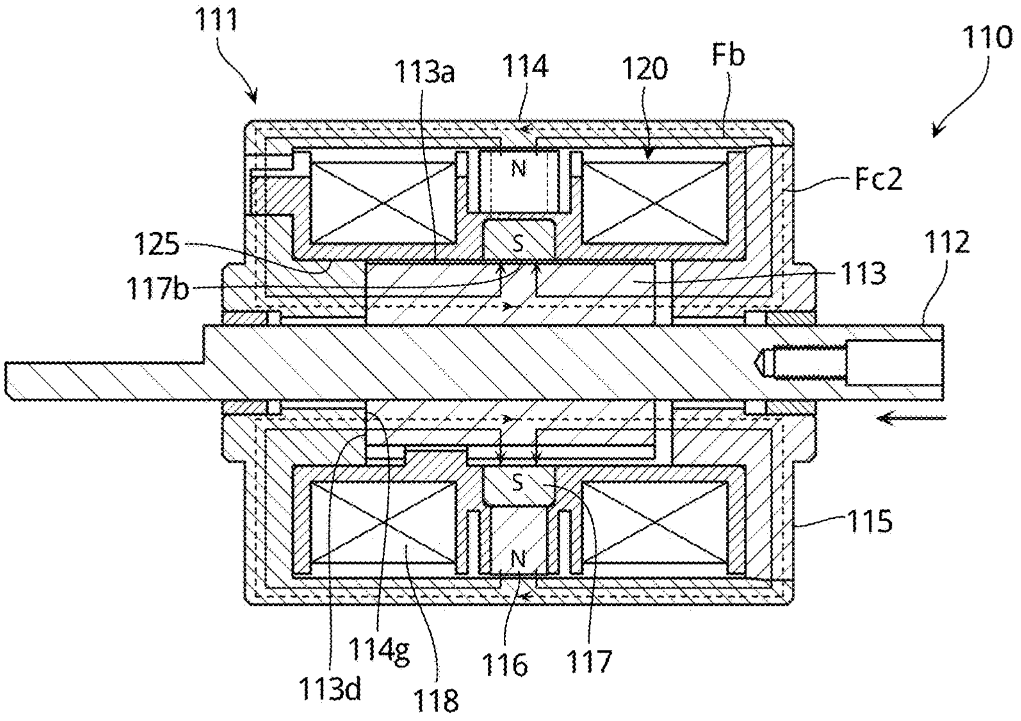
FIG. 11 is a cross-sectional view for explaining an operation of the actuator.

FIG. 10 and FIG. 11 are cross-sectional views for explaining operations of the actuator 110. FIG. 10 shows an operation during discharging, whereas FIG. 11 shows an operation during suction.

In the actuator 110, in the state where force in the axial direction based on tension of the diaphragm 14, internal pressure of the pump chamber 13, and the like is in balance with force generated by causing an electric current to flow through the coil 118 of the stator main body 120, due to a bias magnetic flux Fb (see FIG. 10 and FIG. 11) occurring from the permanent magnet 116 disposed so as to have the movable element 113 of the movable shaft 112 interposed in the radial direction, the movable element 113 is positioned in a neutral position, as shown in FIG. 6, on the inner circumferential side of the stator main body 120. The bias magnetic flux Fb flows through the outside yoke 114, the stopper 115, the movable element 113, and the inside yoke 117.

In this state, when the electric current flowing through the coil 118 is increased, the movable shaft 112 is caused to reciprocate along the axial direction, on the basis of a magnetic field occurring from the electric current flowing through the coil 118 and the orientation of a magnetic field occurring from the permanent magnet 116. The direction in which the movable shaft 112 moves is determined by the magnetic fields which change depending on the direction of the electric current flowing through the coil 118.

As shown in FIG. 10, when an electric current is caused to flow through the coil 118 in the forward direction, for example, a flow of a magnetic flux such as a control magnetic flux Fc1 occurs. Due to a magnetic flux bias generated from the flow of the control magnetic flux Fc1 occurring from the electric current and the flow of the bias magnetic flux Fb occurring from the permanent magnet 116, thrust is generated which moves the movable shaft 112 to which the movable element 113 is attached, in a forward direction as indicated with the arrow in the drawing. More specifically, the two magnetic fluxes positioned on the right side in the drawing of the central part, in the axial direction, of the stator main body 120 strengthen each other, whereas the two magnetic fluxes positioned on the left side in the drawing weaken each other.

As a result, the movable shaft 112 moves forward together with the movable element 113, so that the diaphragm 14 makes the pump chamber 13 contract, and the discharge operation is thus performed. In this situation, it is possible to control the movement of the movable element 113 so that an axial direction end surface 113*c* of the movable element 113 is prevented from colliding with an axial direction end surface 115*d* of the second projection part 115*a* of the stopper 115, while the outer circumferential surface 113*a* thereof is not in contact with the inner circumferential surface 117*b* of the inside yoke 117 and the inner circumferential surface 125 of the stator frame 121. It is therefore possible to reduce operation sounds to almost none.

In contrast, as shown in FIG. 11, for example, when an electric current is caused to flow through the coil 118 in the backward direction, a flow of a magnetic flux such as a control magnetic flux Fc2 occurs. Due to a magnetic flux bias generated from the flow of the control magnetic flux Fc2 occurring from the electric current and the flow of the bias magnetic flux Fb occurring from the permanent magnet 116, thrust is generated which moves the movable shaft 112 to which the movable element 113 is attached, in a retreating direction as indicated with the arrow in the drawing. More specifically, the two magnetic fluxes positioned on the left side in the drawing of the central part, in the axial direction, of the stator main body 120 strengthen each other, whereas the two magnetic fluxes positioned on the right side in the drawing weaken each other.

As a result, the movable shaft 112 retreats together with the movable element 113, so that the diaphragm 14 makes the pump chamber 13 expand, and the suction operation is thus performed. In this situation, it is possible to control the movement of the movable element 113 so that an axial direction end surface 113*d* of the movable element 113 is prevented from colliding with an axial direction end surface 114*g* of the first projection part 114*d* of the outside yoke 114, while the outer circumferential surface 113*a* thereof is not in contact with the inner circumferential surface 117*b* of the inside yoke 117 and the inner circumferential surface 125 of the stator frame 121. It is therefore possible to reduce operation sounds to almost none. As for the movable shaft 112, as a result of alternately switching the electric current in the forward direction and the backward direction in such manner, the movable shaft 112 pivotally supported by the bearings 119 is caused to reciprocate in the axial direction, while the movable element 113 is in contact with nothing.

Another Configuration of the Actuator

Figure 12:
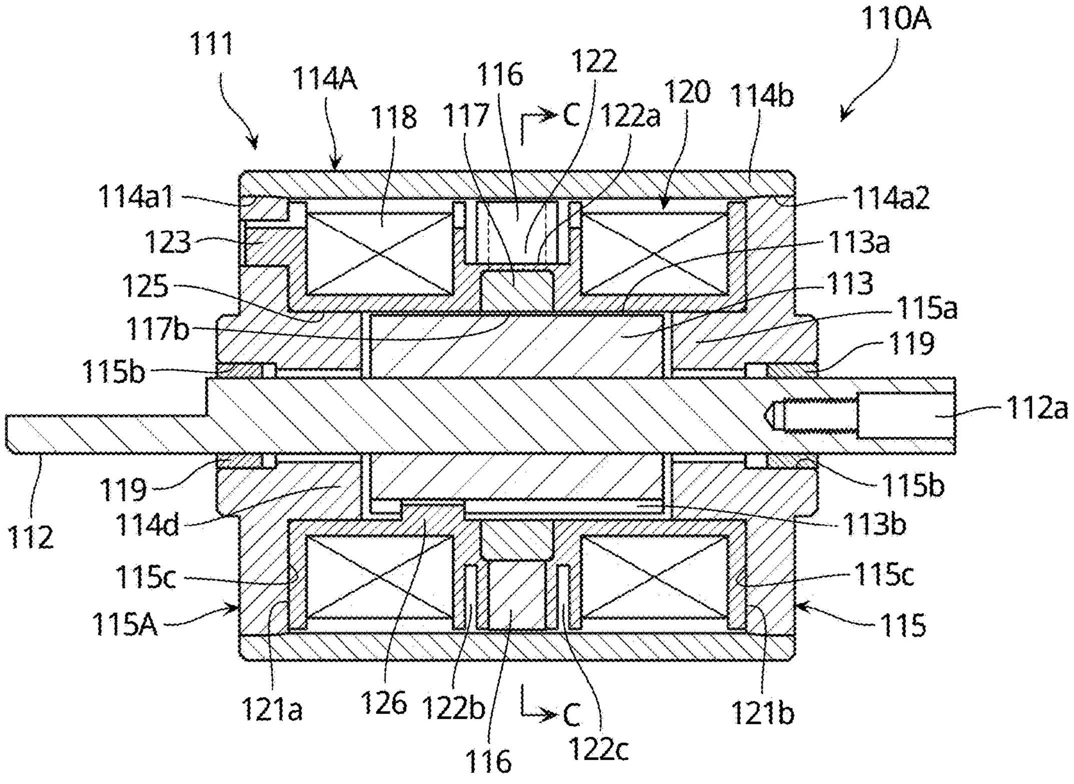
FIG. 12 is a cross-sectional view showing an actuator according to another embodiment of the present invention.

FIG. 12 is a cross-sectional view showing an actuator according to another embodiment of the present invention. In the following explanation including FIG. 12, because some of the constituent elements that are the same as those in the previous embodiment are referred to by using the same reference characters, duplicate explanations will be omitted below.

As shown in FIG. 12, an actuator 110A according to the present embodiment is the same as the previous embodiment in that an outside yoke 114A includes the circular cylindrical part 114*b* and is different from the previous embodiment in that a first stopper 115A and a second stopper 115 are fitted, respectively, into openings 114*a*1 and 114*a*2 located at opposite ends, in the axial direction, of the outside yoke 114A.

In other words, the bottom part 114*c* and the first projection part 114*d* of the outside yoke 114 in the previous embodiment are configured as the first stopper 115A serving as an assembly component part different from the circular cylindrical part 114*b*. In such configuration also, the stator main body 120 is sandwiched and held in the axial direction by the first projection part 114*d* and the second projection part 115*a*. Accordingly, because the stator main body 120 is accurately positioned and fixed with respect to the outside yoke 114A, the first stopper 115A, and the second stopper 115, it is possible to achieve the same functions and advantageous effects as those in the previous embodiment where it is possible to accurately carry out the centering of the movable shaft 112, and the like. According to the present embodiment, because the outside yoke 114A has a circular cylindrical shape, the manufacturing is easier than in the previous embodiment.

A number of embodiments of the present invention have thus been explained. However, these embodiments have been presented as examples and are not intended to limit the scope of the invention. It is possible to carry out these novel embodiments in other various modes and to make various omissions, substitutions, and changes without departing from the gist of the invention. The embodiments and modifications thereof are included in the scope and the gist of the invention and are also covered by the inventions set forth in the claims and equivalents thereof.

REFERENCE SIGNS LIST

10: pump head
50: device main body part
100: pump device
110, 110A: actuator
111: stator
112: movable shaft
113: movable element
114, 114A: outside yoke
115, 115A: stopper
116: permanent magnet
117: inside yoke
118: coil
119: bearing
120: stator main body
121: stator frame

The invention claimed is:

1. An actuator comprising:
a stator having a circular cylindrical shape;
a movable shaft inserted inside the stator and configured to reciprocate in an axial direction; and
a movable element having a circular cylindrical shape and being provided inside the stator and integrally attached to the movable shaft, wherein
the stator includes
a stator main body having a circular cylindrical shape,
an outside yoke being structured with a magnetic material, having a circular cylindrical shape, and accommodating the stator main body therein, and
a first stopper and a second stopper being structured with a magnetic material and configured to close openings located at opposite ends of the outside yoke,
the stator main body includes
an inside yoke being structured with a magnetic material, having an annular shape, facing the movable element in a radial direction and being arranged so as to surround an outer circumference in a central part, in the axial direction, of the movable element, a permanent magnet having an annular shape and being attached to an outer circumference of the inside yoke, a stator frame having a circular cylindrical shape, including a bobbin which is provided on at least one side, in the axial direction, of the inside yoke and the permanent magnet and around which a coil is wound, and being configured to support the inside yoke and the permanent magnet, and the coil wound around the bobbin of the stator frame, the first stopper includes a first projection part having a circular cylindrical shape and projecting from a central area toward the second stopper, and has a first hole part through which the movable shaft is inserted at a center of the first stopper, the second stopper includes a second projection part having a circular cylindrical shape and projecting from a central area toward the first stopper, and has a second hole part through which the movable shaft is inserted at a center of the second stopper, the first projection part and the second projection part are fitted in opposite end portions, in the axial direction, of the stator frame, the movable element is disposed between the first projection part and the second projection part, and attached to the first hole part and the second hole part are bearings that support the movable shaft so as to capable of reciprocating.

2. The actuator according to claim 1, wherein the inside yoke is arranged with the stator frame by insert molding.

3. The actuator according to claim 1 or 2, wherein the permanent magnet is magnetized in the radial direction.

4. The actuator according to claim 1, wherein the permanent magnet includes a plurality of magnet pieces each having an arc shape.

5. The actuator according to claim 1, wherein an inner circumferential surface of the permanent magnet is in direct contact with an outer circumferential surface of the inside yoke.

6. The actuator according to claim 1, wherein an outer circumferential surface of the permanent magnet is in direct contact with an inner circumferential surface of the outside yoke.

7. The actuator according to claim 1, wherein the bobbin includes a first bobbin provided on one side, in the axial direction, of the inside yoke and the permanent magnet and a second bobbin provided on the other side, the stator frame has a winding groove for passing a winding from the first bobbin to the second bobbin, and the coil is continuously wound around from the first bobbin to the second bobbin via the winding groove.

8. The actuator according to claim 1, wherein the outside yoke and the first stopper are integrally formed.

9. The actuator according to claim 2, wherein the permanent magnet is magnetized in the radial direction.

10. The actuator according to claim 2, wherein the permanent magnet includes a plurality of magnet pieces each having an arc shape.

11. The actuator according to claim 2, wherein an inner circumferential surface of the permanent magnet is in direct contact with an outer circumferential surface of the inside yoke.

12. The actuator according to claim 2, wherein an outer circumferential surface of the permanent magnet is in direct contact with an inner circumferential surface of the outside yoke.

* * * * *